C. A. CHESHIRE.
BOOK GATHERING AND STACKING MACHINE.
APPLICATION FILED FEB. 20, 1914.
1,160,845.
Patented Nov. 16, 1915.
15 SHEETS—SHEET 15.
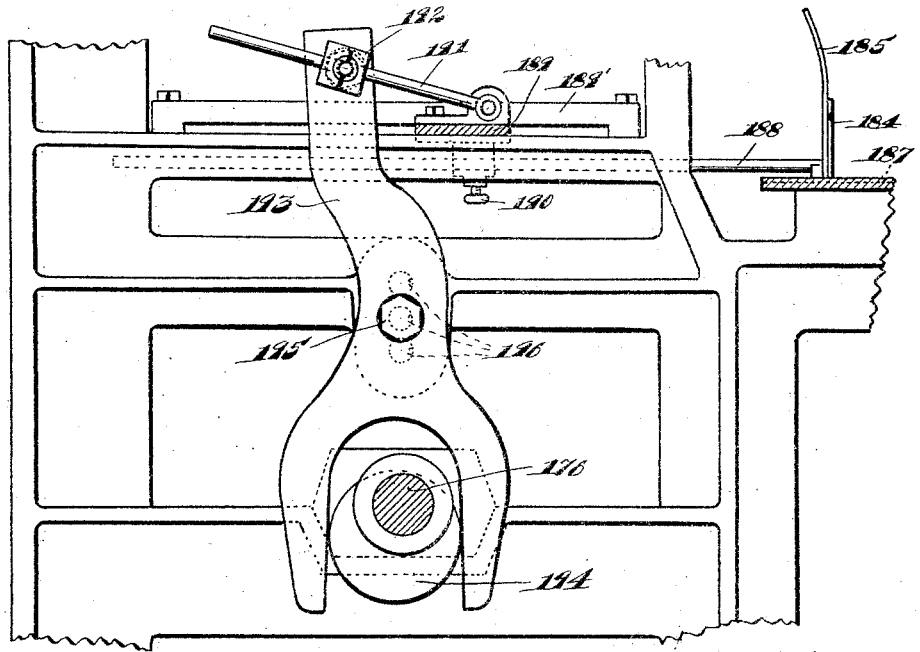
Fig. 26.
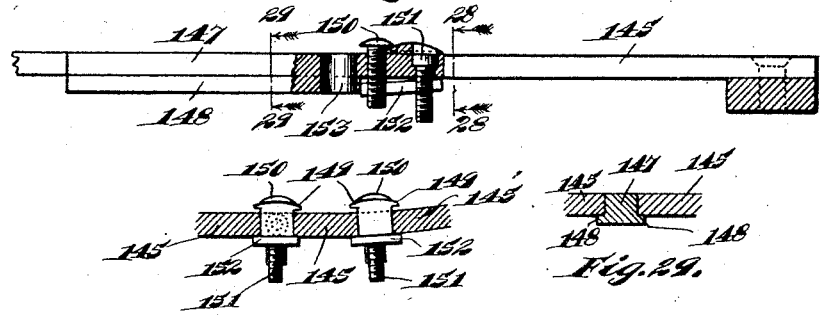
Fig. 27.
Fig. 28.
Fig. 29.
Witnesses:
E. E. Wessels.
B. J. Richards.
Inventor:
Carey A. Cheshire,
By Joshua R. H. Potts
his Attorney.

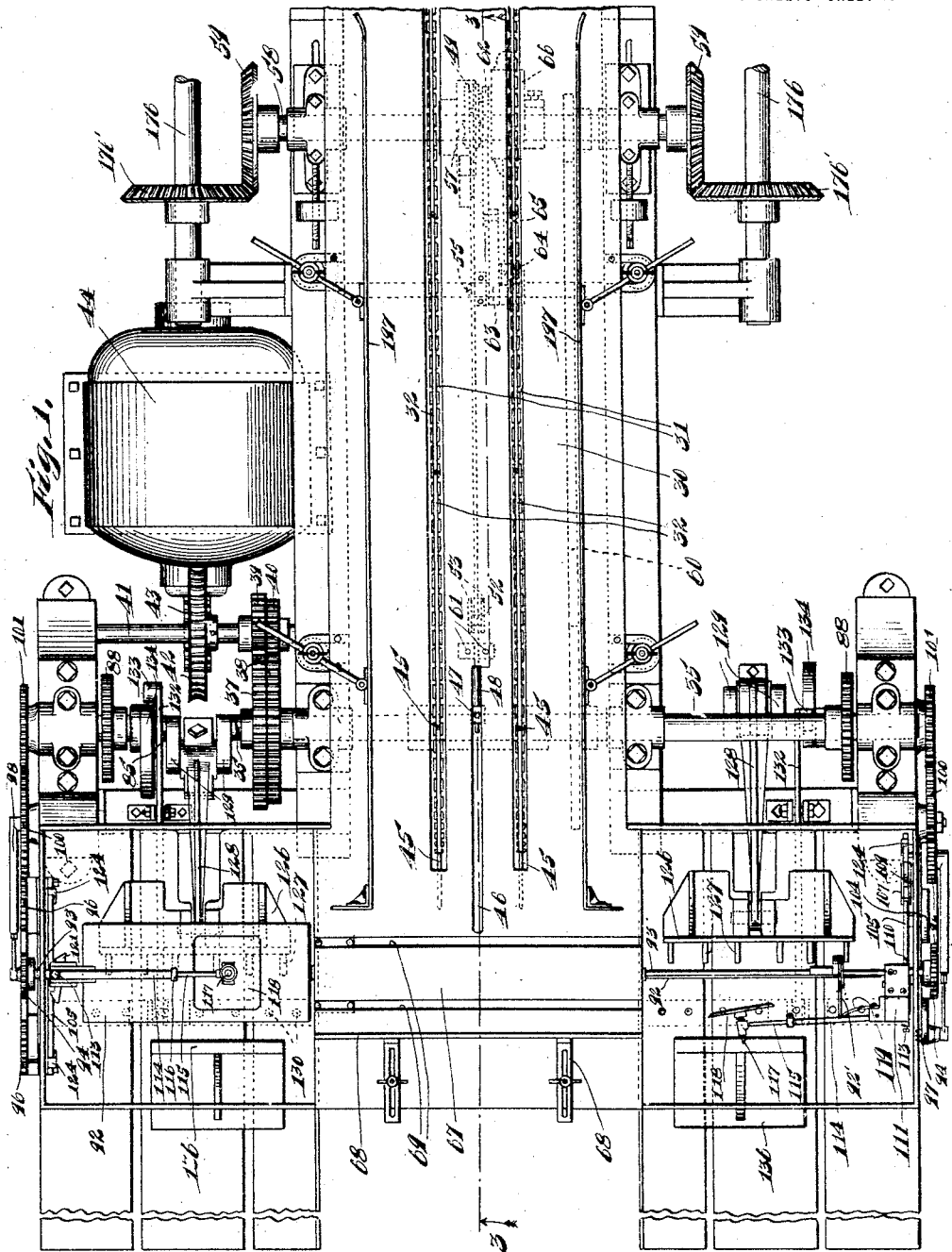

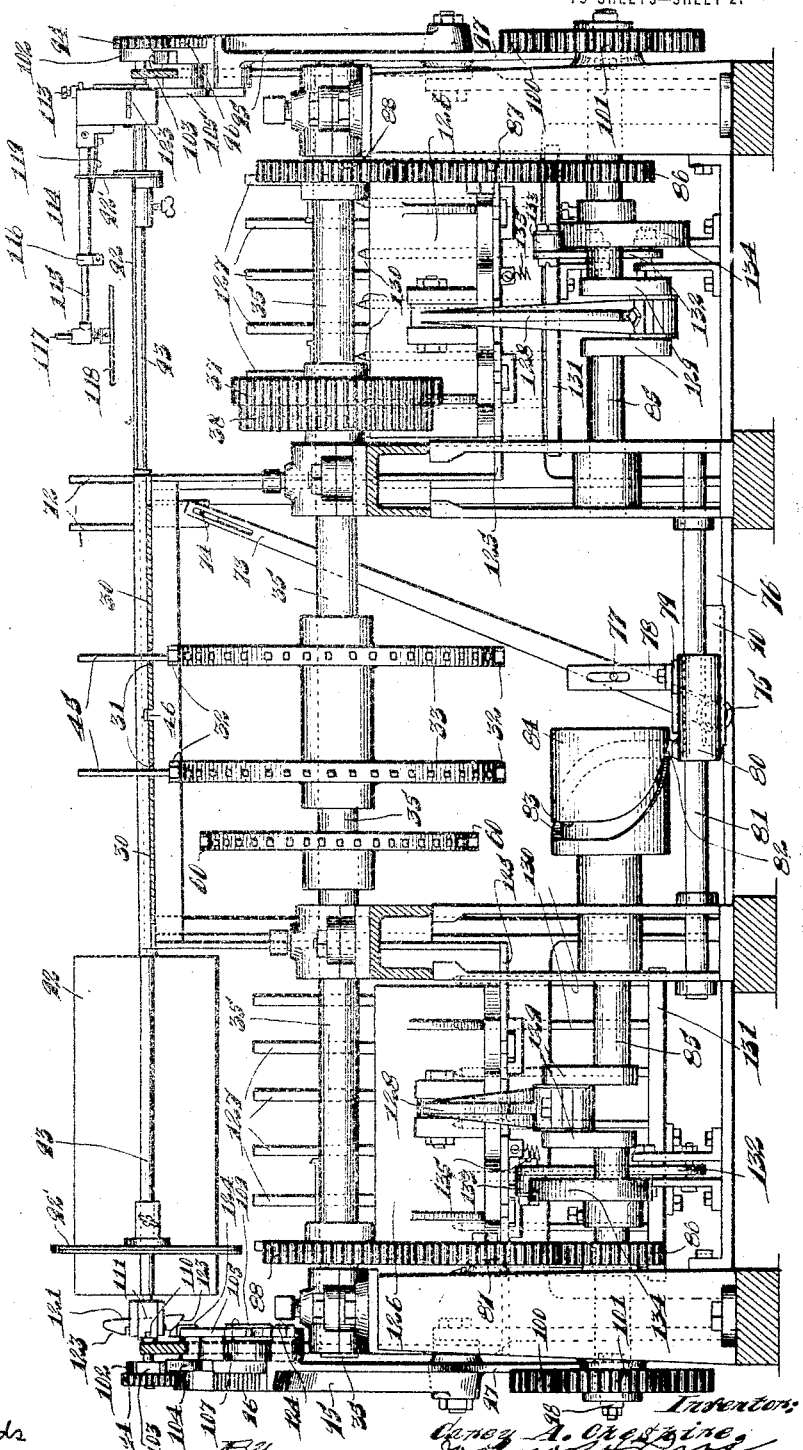

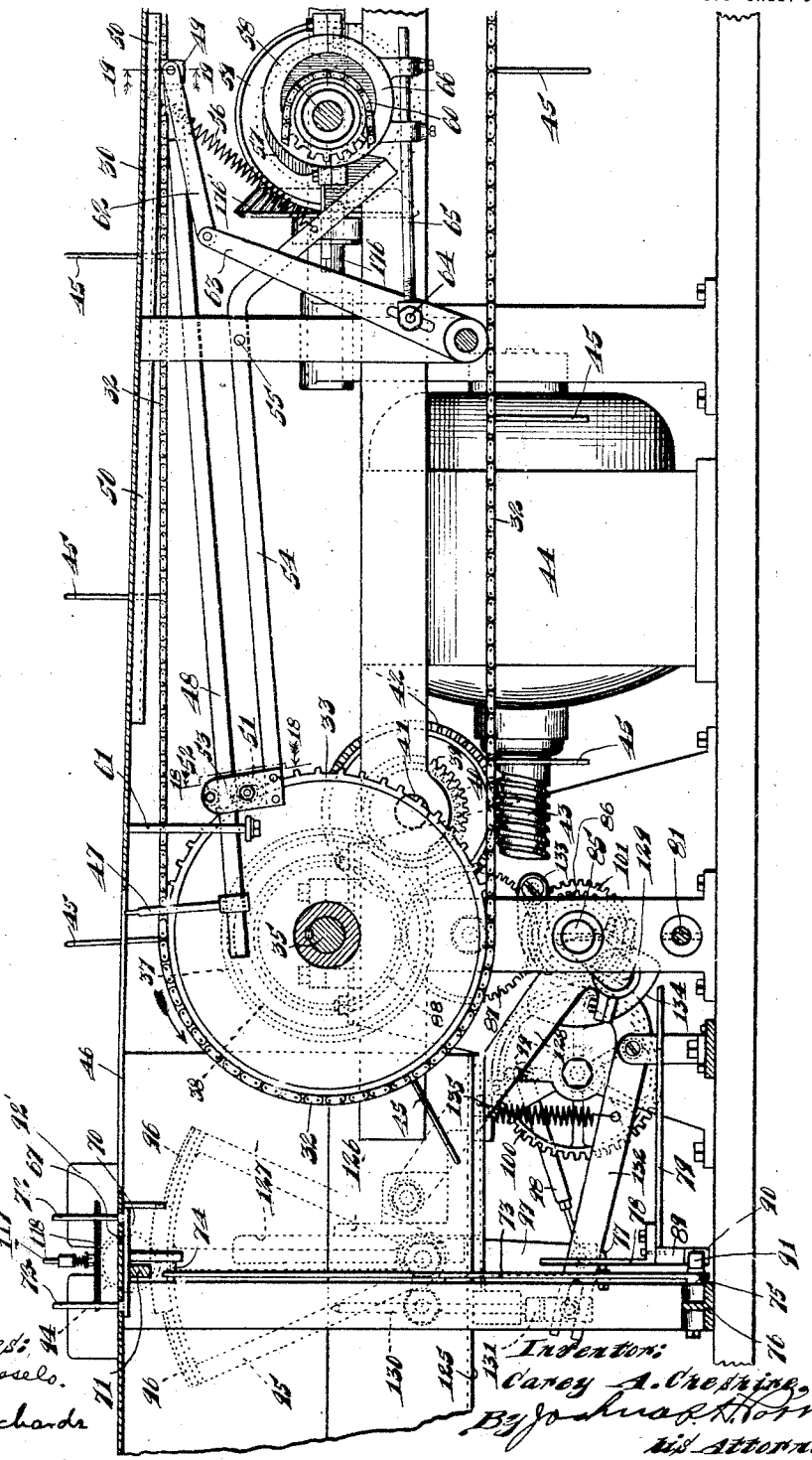

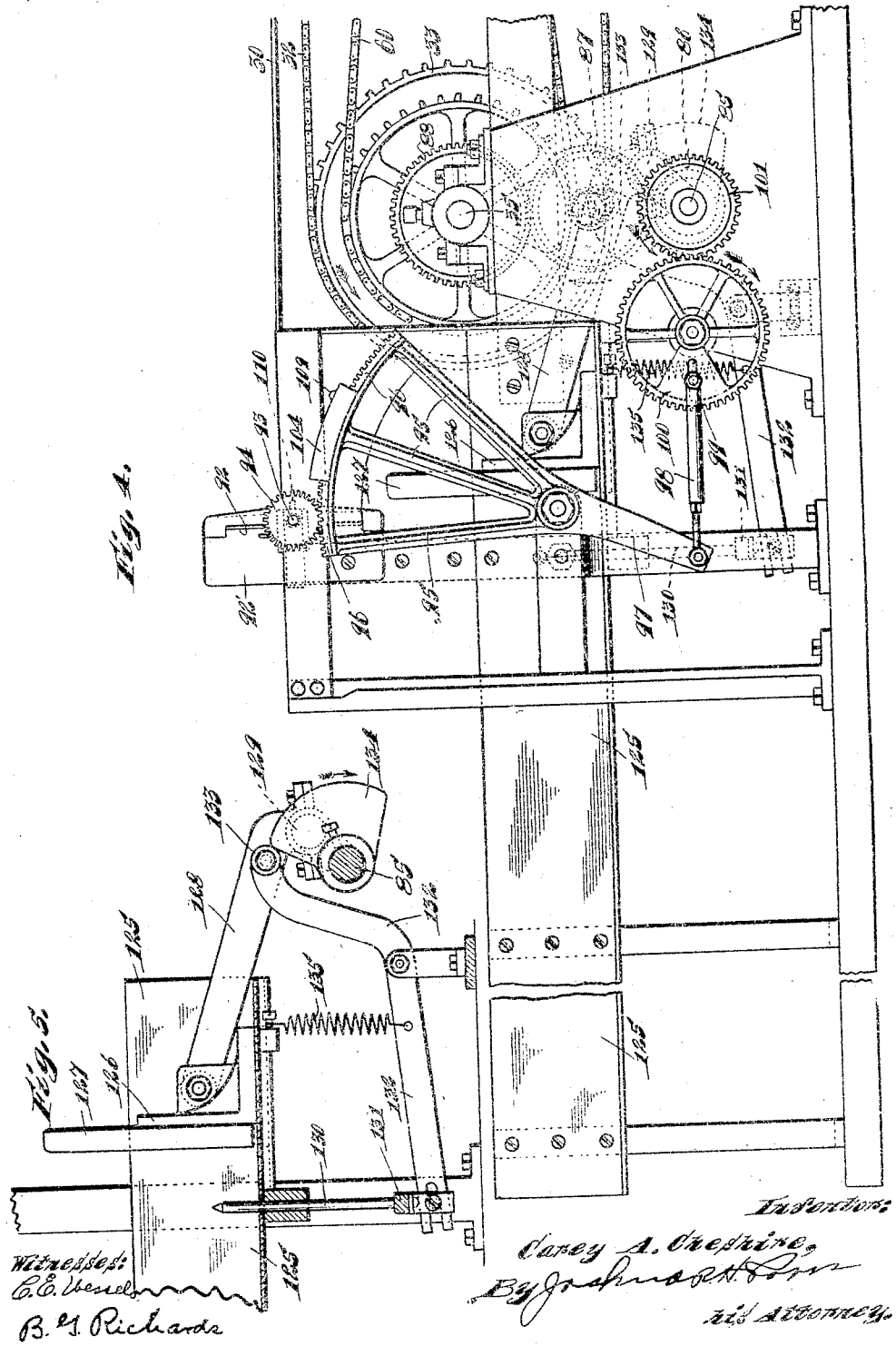

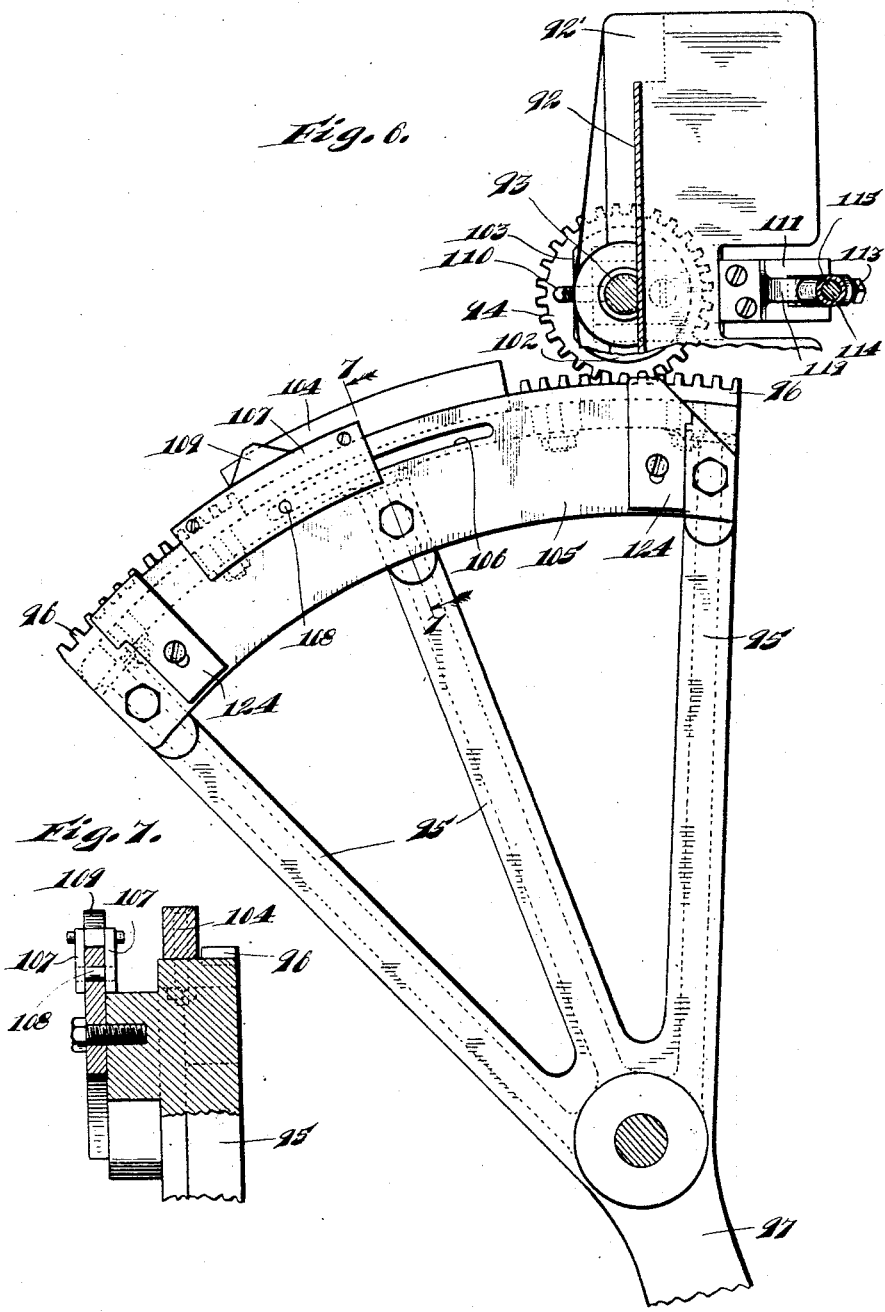

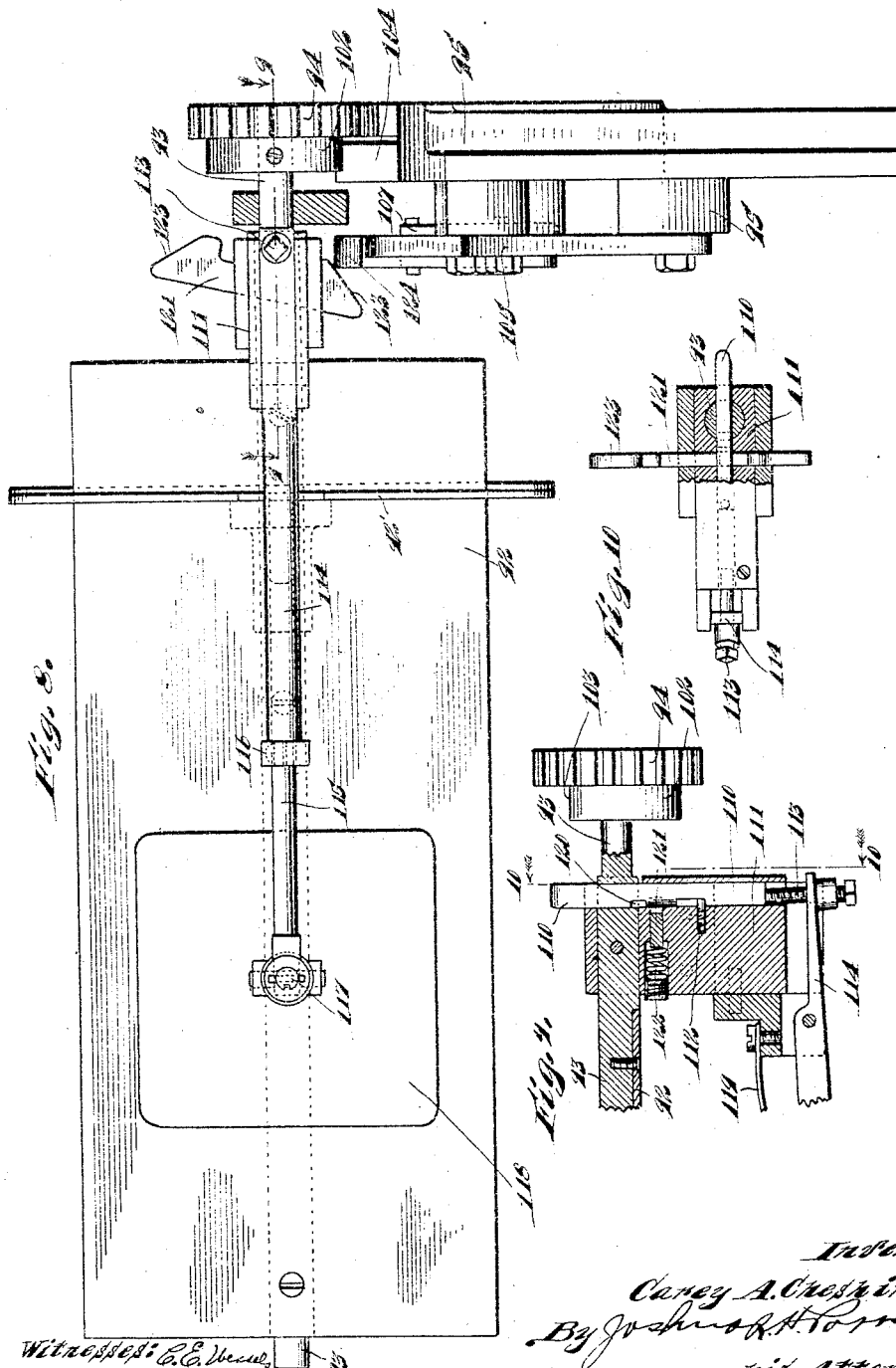

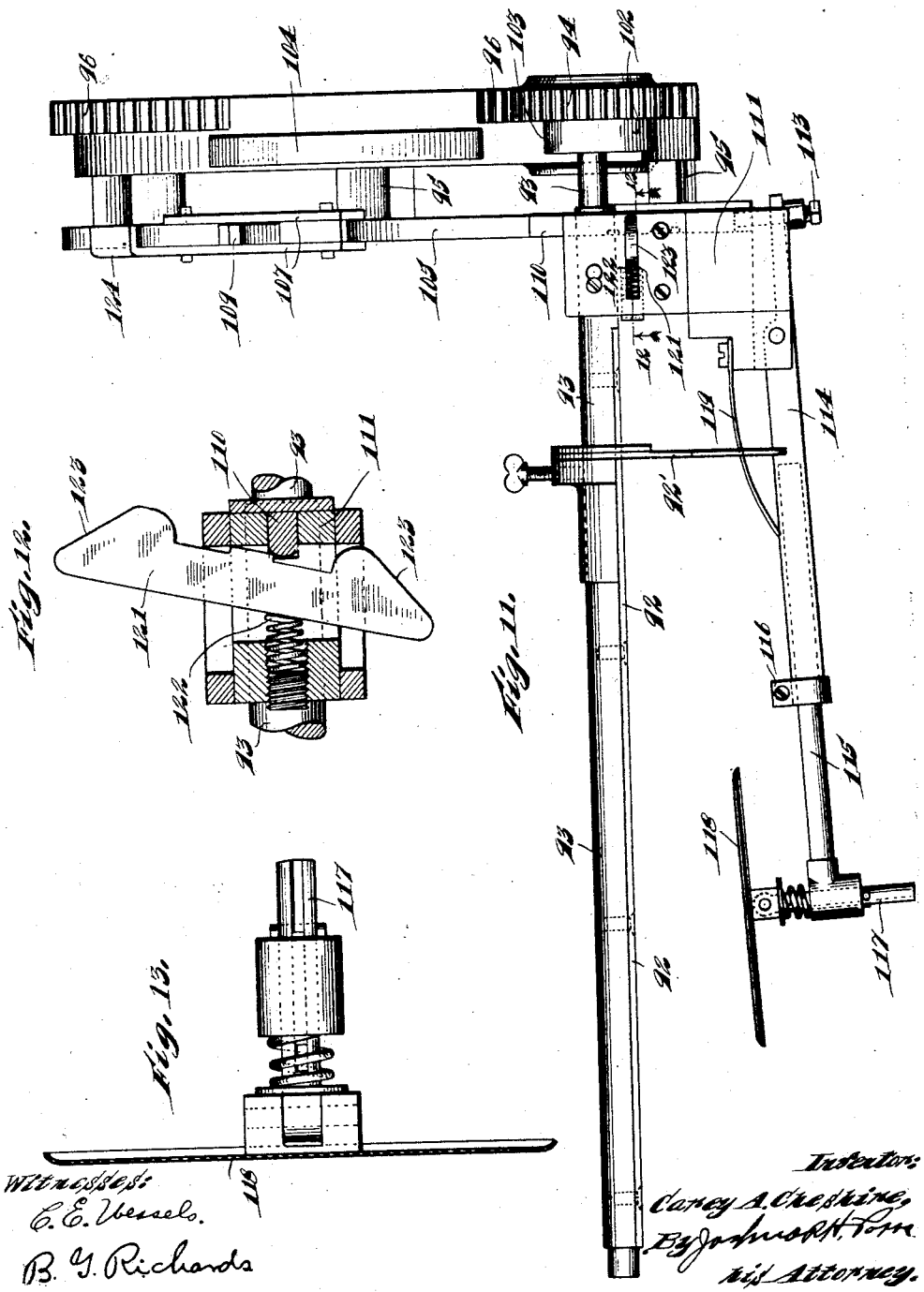

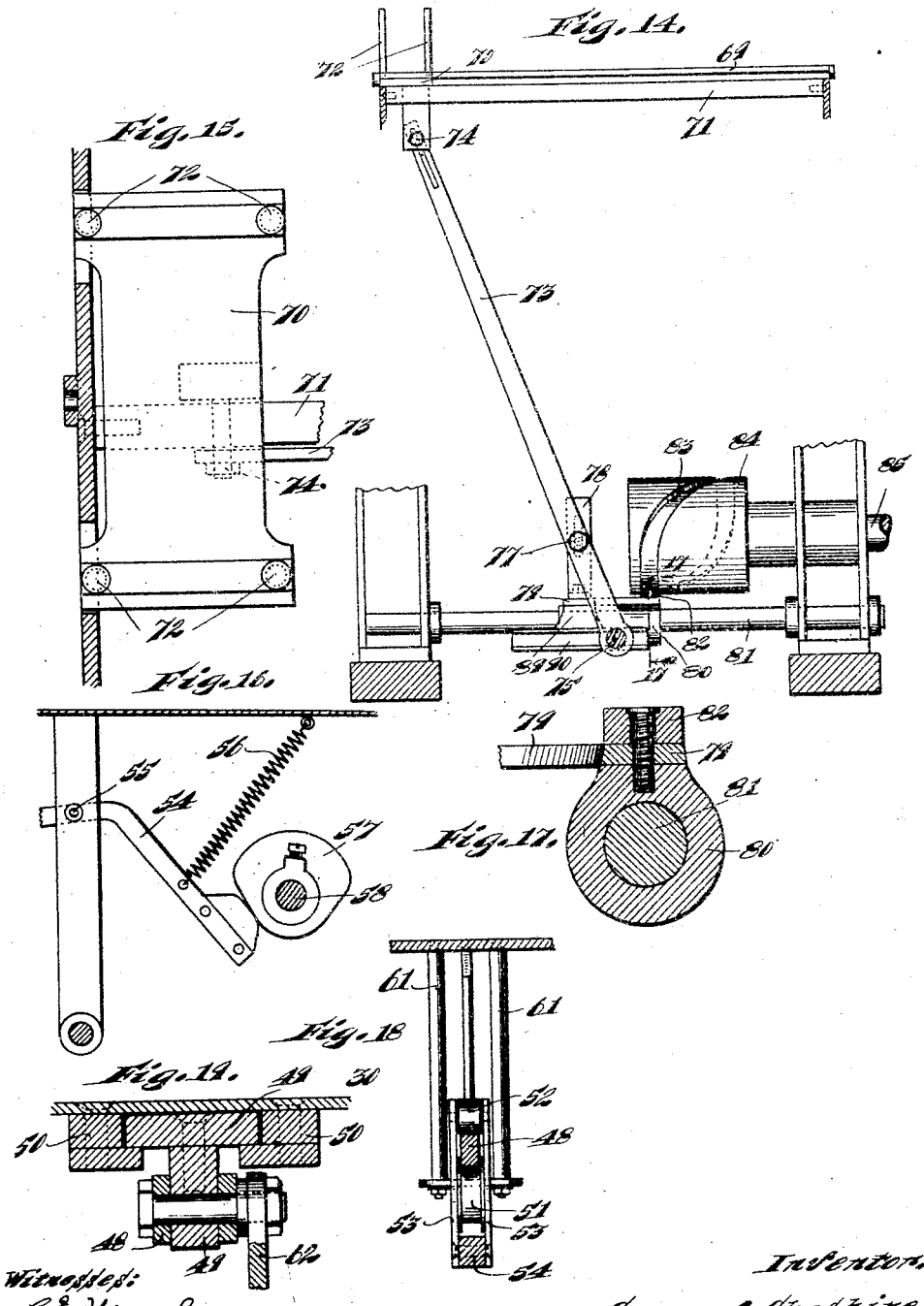

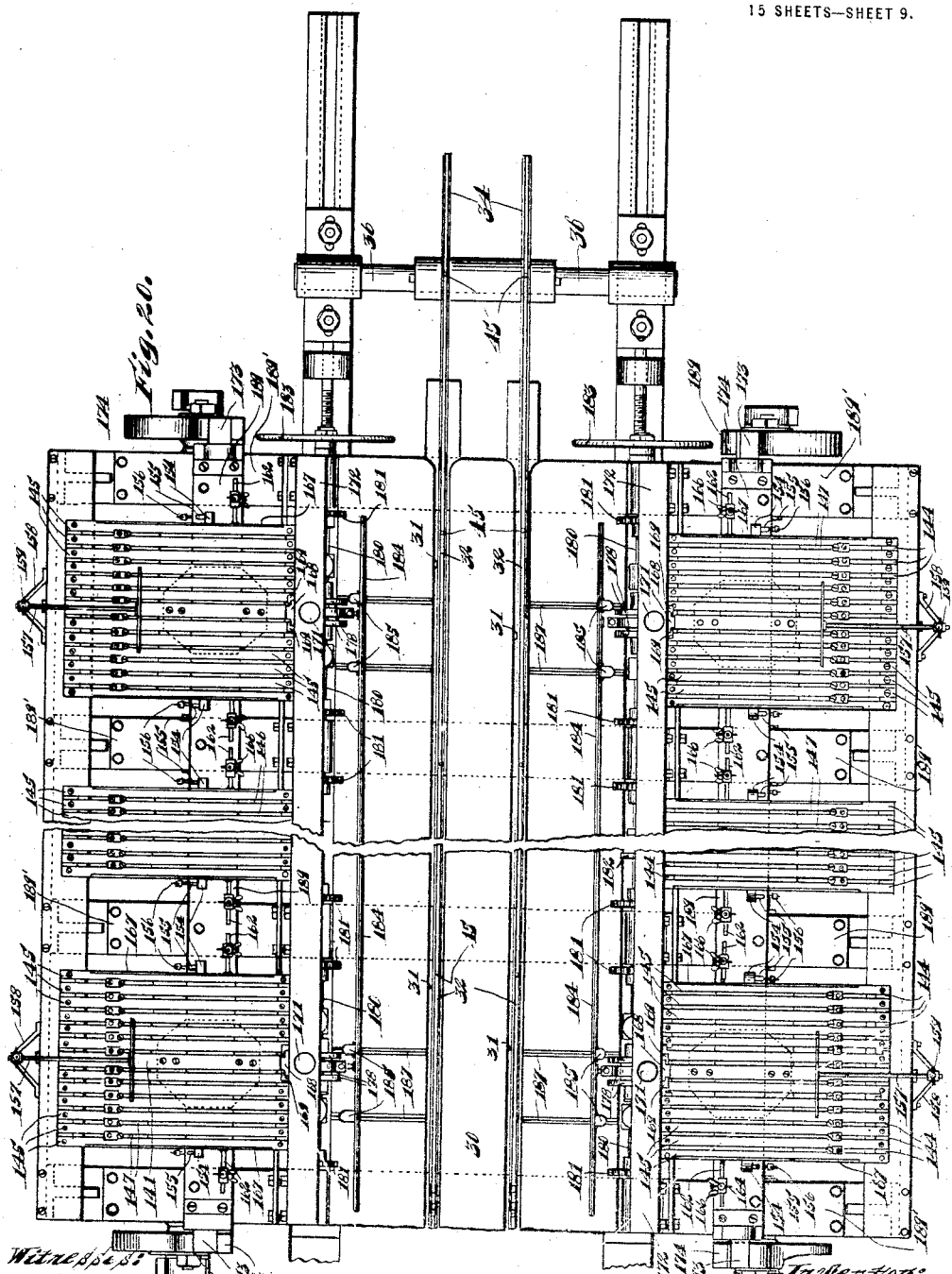

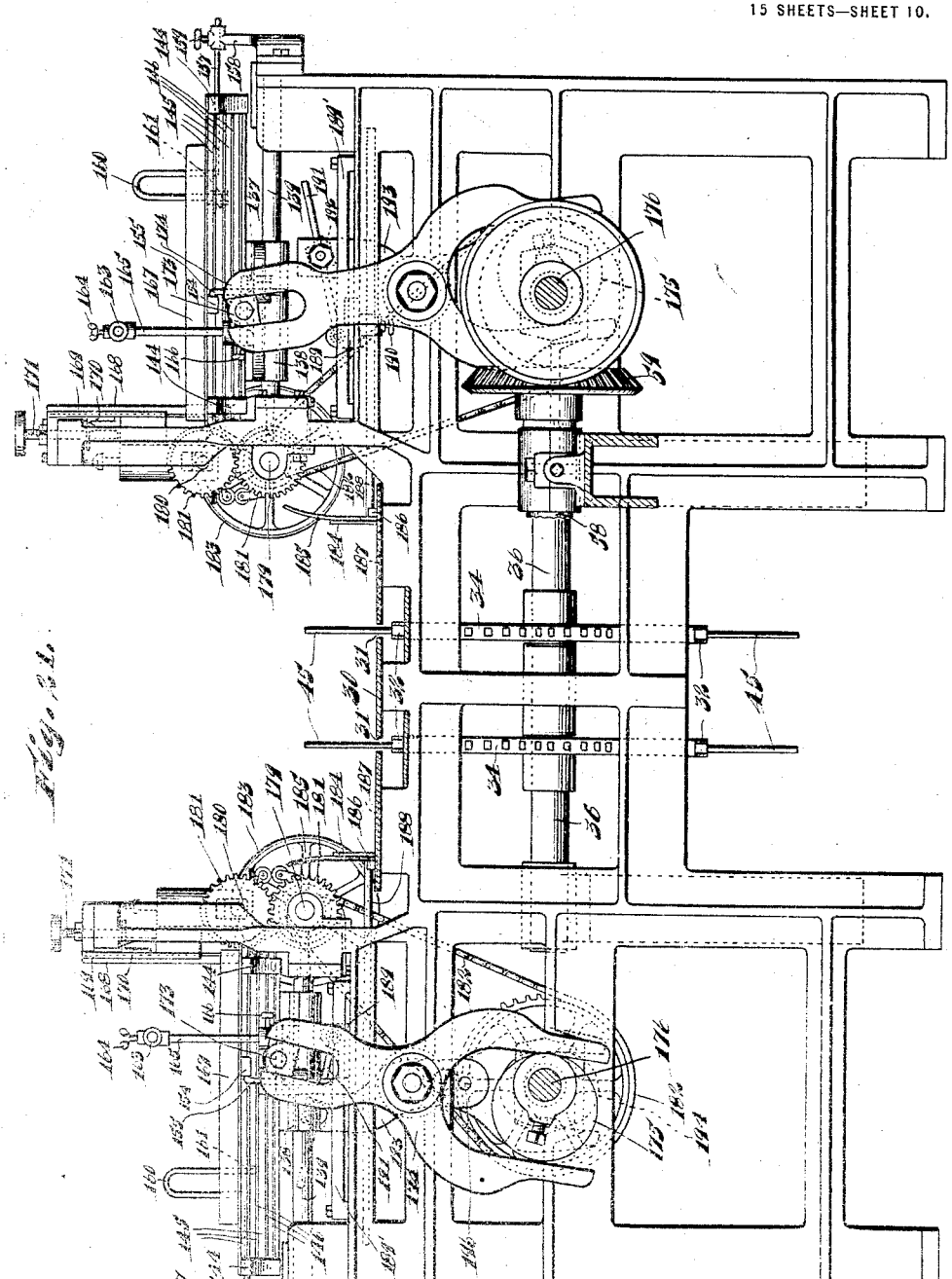

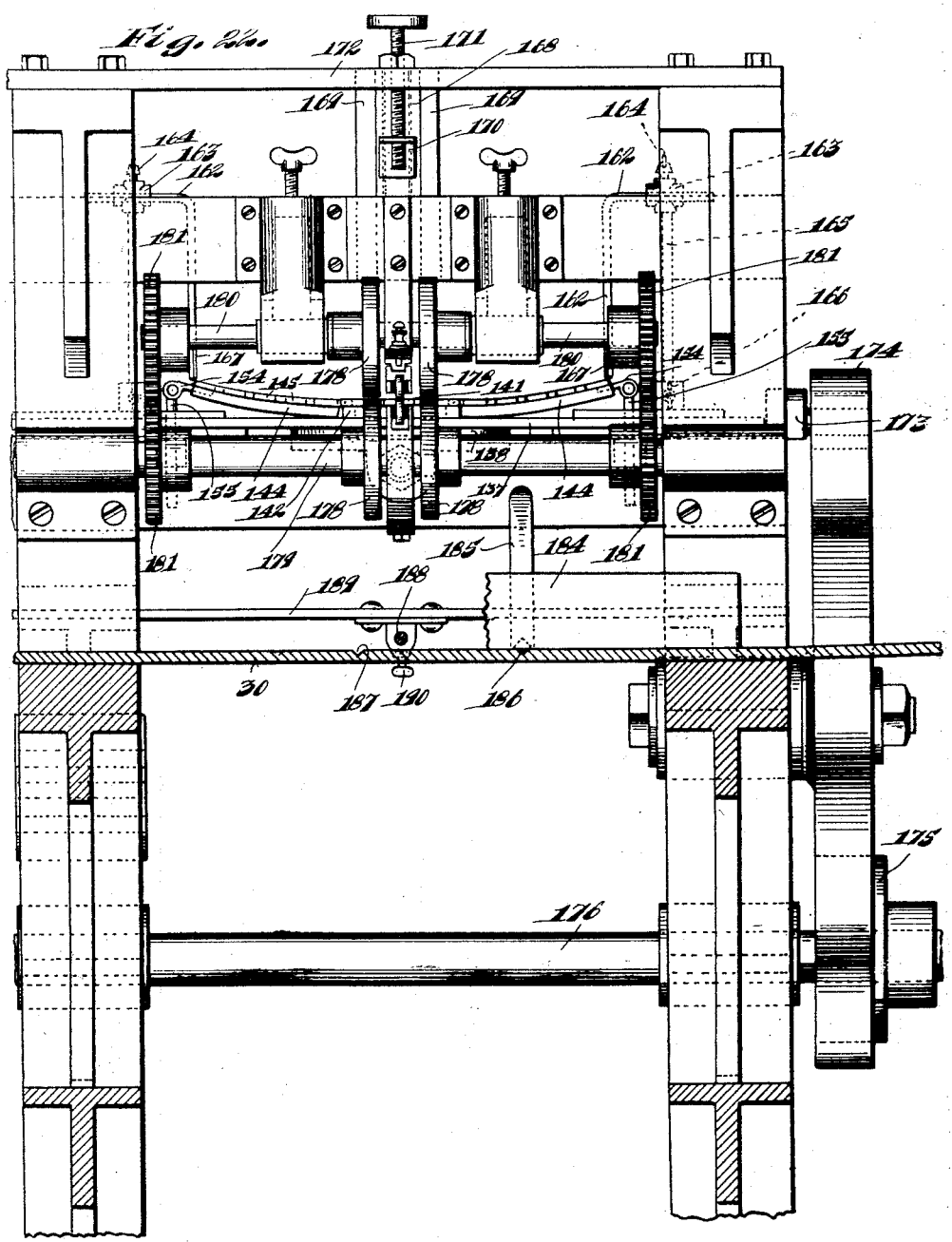

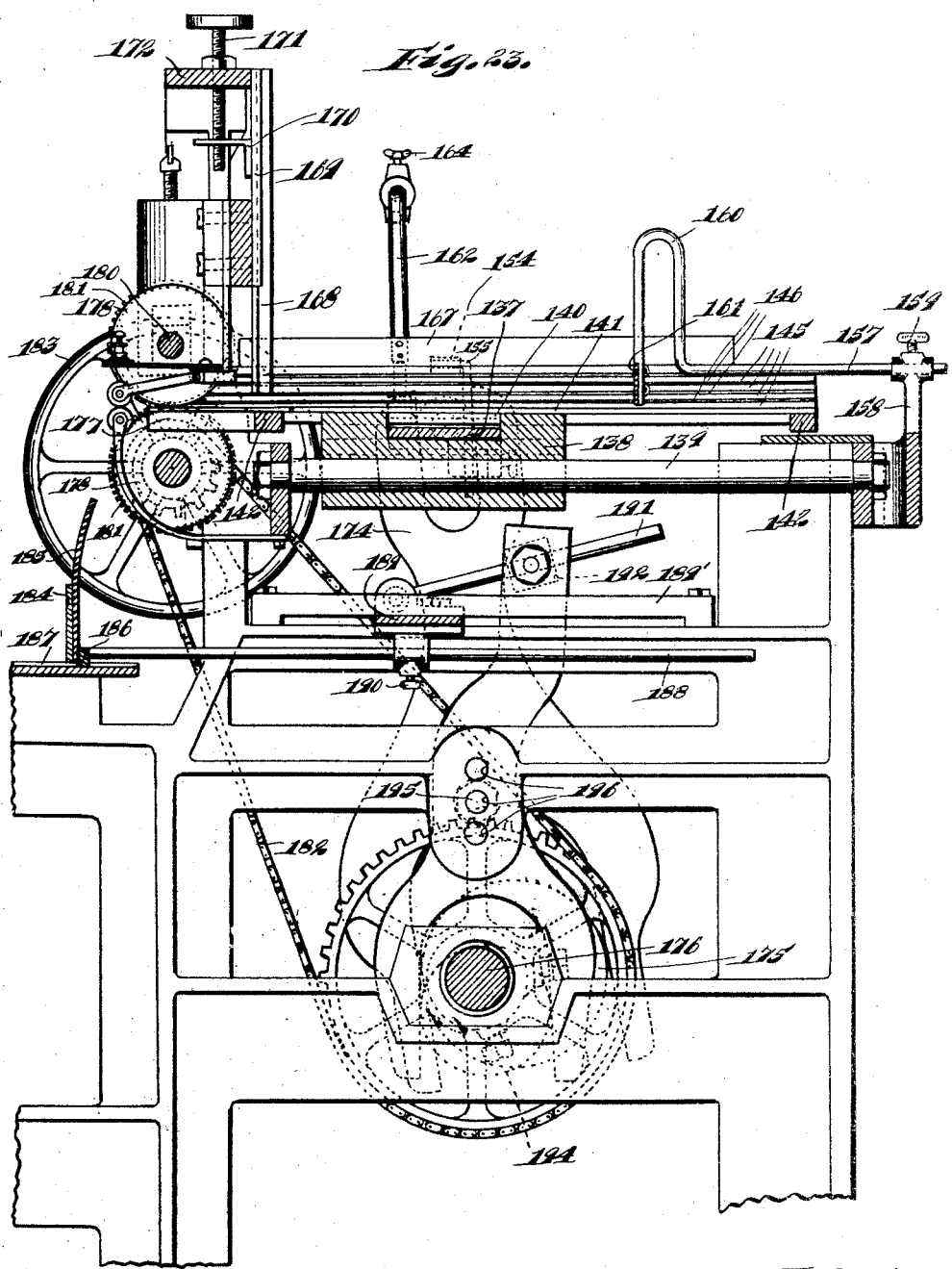

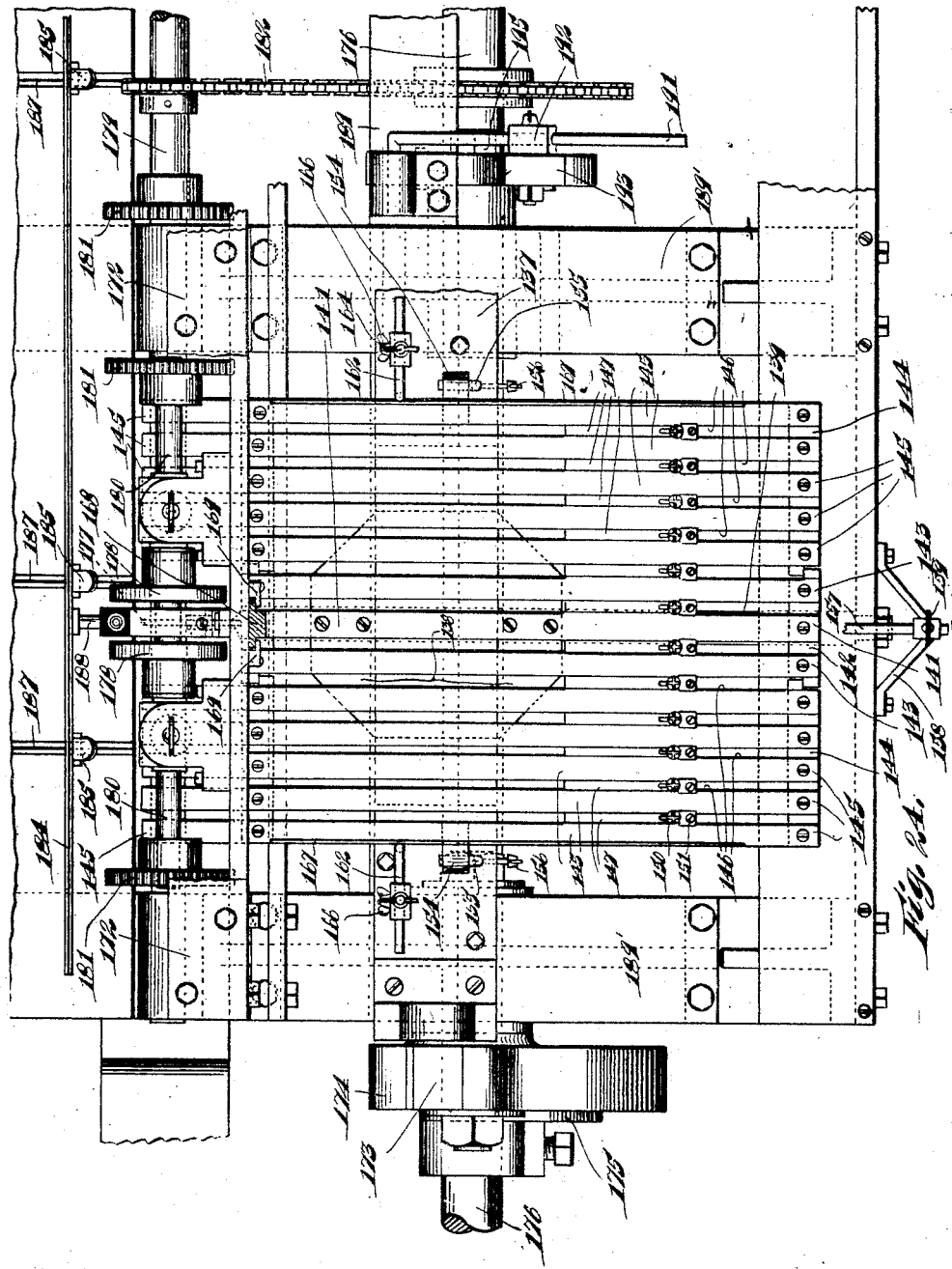

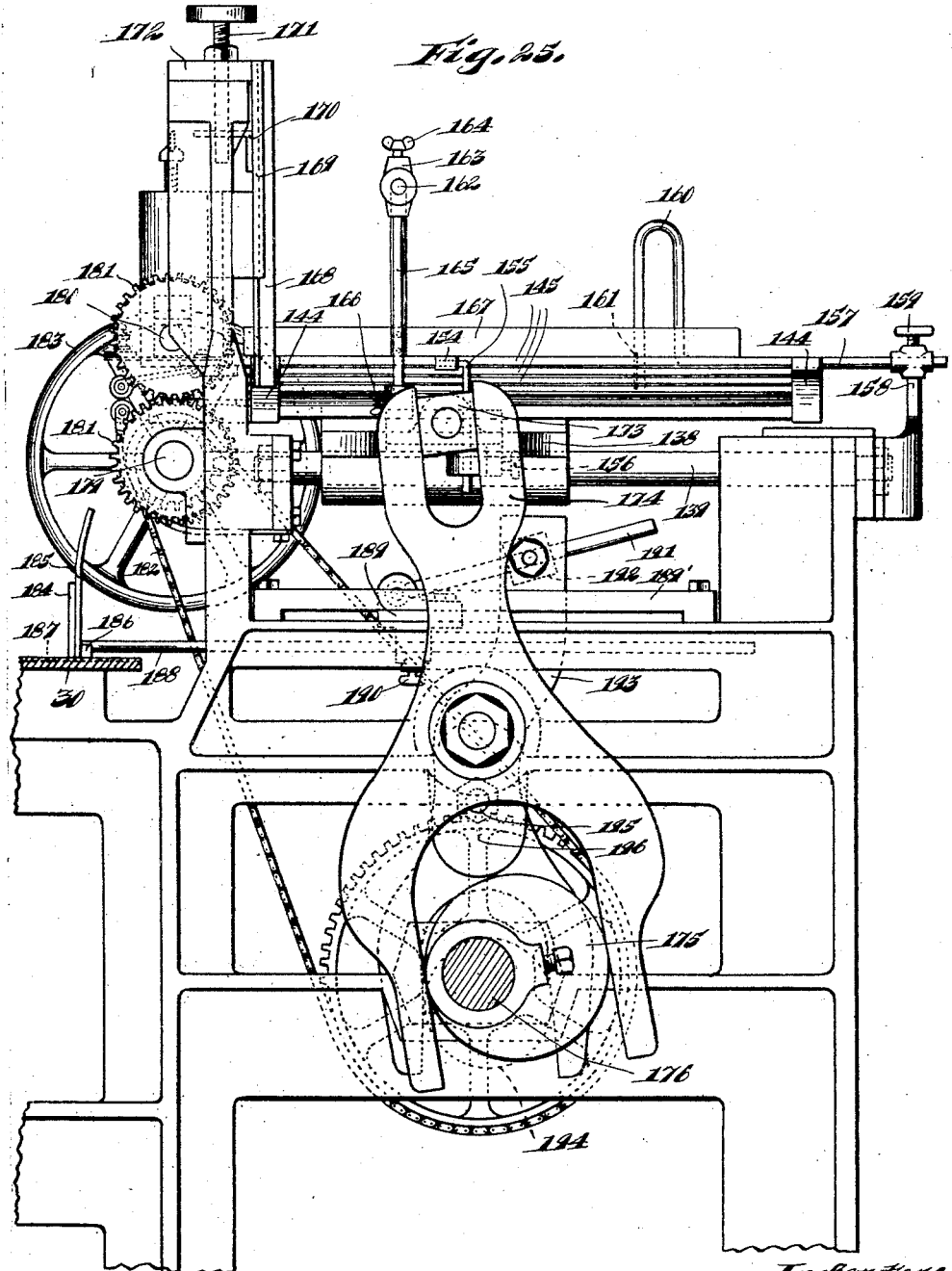

UNITED STATES PATENT OFFICE.

CAREY A. CHESHIRE, OF CHICAGO, ILLINOIS.

BOOK GATHERING AND STACKING MACHINE.

1,160,845.  Specification of Letters Patent.  Patented Nov. 16, 1915.

Application filed February 20, 1914. Serial No. 819,925.

*To all whom it may concern:*

Be it known that I, CAREY A. CHESHIRE, a citizen of the United States, and a resident of the city of Chicago, county of Cook, and State of Illinois, have invented certain new and useful Improvements in Book Gathering and Stacking Machines, of which the following is a specification.

My invention relates to improvements in stacking and signature gathering machines, and has for its object the provision of an improved machine of this character which is uniform in action, capable of operation at comparatively high speed, and which arranges the gathered books in convenient relation for bundling or stitching.

The invention consists in the combinations and arrangements of parts hereinafter described and claimed.

The invention will be best understood by reference to the accompanying drawings forming a part of this specification, and in which, Figure 1 is a top plan view of the stacking end of a machine embodying my invention, Fig. 2, a transverse section of the same, Fig. 3, a longitudinal section taken substantially on line 3—3 of Fig. 1, with parts removed, Fig. 4, a side view corresponding with Fig. 1, Fig. 5, an enlarged detail view of mechanism employed for arranging or stacking the gathered books, Fig. 6, an enlarged view, partially in section of mechanism for reversing the positions of the gathered books, Fig. 7, an enlarged section on line 7—7 of Fig. 6, Fig. 8, a side view corresponding to Fig. 6, Fig. 9, a section taken on line 9—9 of Fig. 8, Fig. 10, a section taken on line 10—10 of Fig. 9, Fig. 11, a top plan view corresponding with Fig. 8, Fig. 12, a section taken on line 12—12 of Fig. 11, Fig. 13, a detail view, partially in section, of a clamping plate and its mountings employed in the construction, Fig. 14, a detail view of mechanism for reciprocating a discharging plate employed in the machine, Fig. 15, an enlarged top plan view of the discharging plate with parts in section, Fig. 16, a detail view of parts employed in removing the gathered books from the domination of the main feed pins of the machine, Fig. 17, an enlarged section taken on line 17—17 of Fig. 14, Fig. 18, an enlarged section taken substantially on line 18—18 of Fig. 3, Fig. 19, an enlarged section taken on line 19—19 of Fig. 3, Fig. 20, a top plan view of portions of the signature gathering end of the machine, Fig. 21, a transverse section of the signature gathering mechanism, Fig. 22, a section taken in front of one of the feed hoppers of the signature gathering mechanism, Fig. 23, a section of a feed hopper taken at right angles to Fig. 22, Fig. 24, a top plan view of a feed hopper, Fig. 25, a section of the machine taken adjacent one of the feed hoppers, Fig. 26, an enlarged view showing mechanism employed in laterally positioning or "jogging" the books being gathered, Fig. 27, a sectional view taken through one of the feed plates of the feed hoppers, Fig. 28, a section taken on line 28—28 of Fig. 27, and Fig. 29, a section taken on line 29—29 of Fig. 27.

The preferred form of construction as illustrated in the drawings comprises a conveyer table 30 having longitudinal slots 31 therein. Feed chains 32 are arranged under table 30 and pass over sprockets 33 and 34 arranged on shafts 35 and 36 at the front and rear ends of the machine, as shown in Figs. 2, 3, 20 and 21. Shaft 35 is the main driving shaft of the machine and is driven by means of gears 37 and 38 of different sizes thereon and meshing with different sized gears 39 and 40 fixed to a countershaft 41, as shown in Fig. 1. Shaft 41 carries a worm wheel 42 meshing with a worm 43 on the shaft of an electric motor 44. Chains 32 carry conveyer pins 45 which project upwardly through slots 31 in table 30 and serve to push gathered books along table 30. The gathered books are placed upon table 30 by gathering mechanism arranged at each side thereof, as will more fully appear hereinafter. By this arrangement it will be observed, that upon operation of motor 44, chains 32 will be operated to cause pins 45 to push the books along table 30, and that by loosening one of the gears 39 or 40 on shaft 41 and securing the other thereto, the speed of operation of the machine may be changed when desired.

In order to free the gathered books from the domination of pins 45 and thus permit of the passage of said pins downwardly through the end of table 30, I arrange a longitudinal slot 46 in the delivery end of table 30 and provide a delivery or discharge pin 47 which is adapted to ascend through slot 46, traveling faster than pins 45 to remove said books, and then descend through slot 46 and return to initial position, as shown in Fig. 3. This pin 47 is mounted for longitudinal adjustment on a bar 48 which is pivoted at its rear end to a block 49 slidable in guides 50 on the under side of table 30. At its forward end bar 48 is mounted to slide between rollers 51 and 52 arranged in a housing 53 on the forward end of a lever 54 which is pivoted at 55 in the frame of the machine, as shown in Fig. 16. The forward end of lever 54 is normally held in depressed position by a spring 56 and the rear end thereof runs upon a cam 57 fixed to a shaft 58. As shown in Figs. 1 and 4, shaft 58 is provided at each end with a bevel gear 59 and is driven by means of a sprocket chain 60 from the main driving shaft 35. Guide pins 61 arranged at the forward end of table 30 serve to guide and steady the motions of bar 48 and lever 54, as will be readily understood. A link 62 connects block 49 with the upper end of an oscillatory lever 63 which is given a slot and pin connection 64 with a rod 65 carried by an eccentric strap 66 on shaft 58. By this arrangement, it will be observed, that upon rotation of shaft 58, pin 47 will be projected upwardly through slot 46, then moved forwardly at a rate of speed greater than pins 45, then be depressed through slot 46 and returned to initial position. The parts are so arranged and designed that, after each pair of pins 45 passes the position of pin 47, indicated in Fig. 3, this motion of pin 47 takes place thus forcing each gathered book away from the corresponding pins 45 and leaving pins 45 free to pass downwardly through slots 31, as they pass around sprockets 33. The end of table 30 at and immediately adjacent slot 46 is given a slight upward inclination which facilitates the removal of the gathered books from pins 45 and the passage downwardly of said pins through said slots.

Immediately beyond slot 46 is provided a receiving table 67 which is horizontal and forms a continuation of the end of table 30 so that the gathered book moved forwardly by pin 47 will be placed on said receiving table. This table is provided with an adjustable gage or positioning plate 68 against which the gathered books will be placed and positioned by the action of pin 47, as will be readily understood. Table 67 is provided with transverse slots 69 extending the full width thereof, and a delivery plate 70 is arranged to reciprocate under table 67 on a bar 71 and is provided with two pairs of pins 72 projecting upwardly through slots 69 as best shown in Figs. 14 and 15. Plate 70 is reciprocated by means of a lever 73 having a slot and pin connection 74 with the under side of said plate. As shown in Figs. 3 and 14, the lower end of lever 73 is pivoted on a stud 75 rigidly fixed to at boss 76 on a cross bar of the frame of the machine. Lever 73 is given a slot and pin connection 77 with a vertical arm 78 on the forward end of a rearwardly extending horizontal arm 79. At its rear end, arm 79 is fixed to a sleeve 80 which is slidably mounted on a rod 81 arranged transversely of the machine. As shown in Figs. 14 and 17, sleeve 80 also carries a roller 82 operating in a cam slot 83 in a drum 84 fixed at the inner end of one of a pair of operating shafts 85 arranged at each side of table 67. Each of the shafts 85 is driven by means of a gear 86 meshing with an intermediate gear 87 which in turn meshes with a driving gear 88 on shaft 35, as shown in Fig. 2. As shown in Fig. 3, arm 79 carries at its forward end a depending arm 89 provided with a guide-way 90 running on a stud 91 projecting from stud 75. By this arrangement, it will be observed, that upon rotation of drum 84, lever 73 will be caused to reciprocate plate 70 and consequently pins 72. The parts are so arranged and timed that each gathered book is positioned on table 67 while pins 72 are at one terminus of their movement so that on the next movement of said pins, one pair thereof will contact with the corresponding end of the positioned book and push said book laterally from table 67. Thus, at each reciprocation of plate 70, a gathered book will be pushed from one side or the other of table 67 by one or the other sets of pins 72.

As shown in Figs. 1 and 2, a tiltable platform 92 is arranged at each side of table 67 in position to receive the gathered books pushed from said table as explained above and an adjustable gage 92' is arranged on each platform to limit the movement of a book thereon. Each of these platforms is carried by a rocking shaft 93 suitably mounted in the frame of the machine and carrying a pinion 94 at its outer end. Pinion 94 meshes with a rocking member 95 which is provided at its upper edge with a set of gear teeth 96 adjacent each end thereof and adapted to mesh with the corresponding pinion 94 at each end of the rocking movement thereof. At its lower end each of the rocking members 95 carries a depending arm 97 which is connected, as shown in Fig. 4, by means of a link 98 with a crank pin 99 on the side of a gear 100 driven from a gear 101 on shaft 85. By this arrangement it will be observed that the rocking members 95 will be continuously rocked or reciprocated and that at the end of each movement, gear 94 will be engaged by the corresponding gear teeth 96 and the corresponding platform 92 rocked or tilted into a vertical position to permit of the discharge of a gathered book thereon. The different gears 100 are so positioned relatively to each other that crank pins 99 will be timed 90 degrees apart so that rocking members 95 will be rocked in exactly proper manners, thus tilting platforms 92 alternately, and the parts are so arranged that each of the rocking members will be passing through the central portion of its movement at the time the corresponding set of pins 72 push a gathered book from the corresponding side of table 67. Gear 94 is provided with a hub 102 having a side 103 shaped to ride upon a cam block 104 secured to the central portion of the corresponding rocking member 95, so that the corresponding platform 92 will be held in horizontal position during the passage of the central portion of the corresponding rocking member 95 and consequently during the time a gathered book is being delivered from the corresponding side of table 67, thus, at each movement of pin 72 a book will be placed upon one of the platforms 92 ready for delivery.

As shown in Figs. 6, 8, and 11, each of the rocking members 95 carries a segmental plate 105 spaced inwardly therefrom and each of said plates is provided with a segmental slot 106. A saddle 107 is slidably mounted on each of the plates 105 and provided with a pin 108 operating in the slot 106, the saddle 107 carrying an upwardly projecting double-acting cam member 109. Cam member 109 is arranged to strike the lower end of a plunger 110 which is slidably mounted in a head 111 and has its movement limited by means of a pin 112, as shown in Fig. 9. Head 111 is secured to the corresponding shaft 93 in position so that the protruding end of plunger 110 will strike cam projection 109 as the corresponding rocking member 95 moves through the central portion of its movement in each direction. At its outer end, plunger 110 contacts with a set screw 113 carried by the end of a lever 114 pivotally mounted on head 111 and carrying at its other end a telescoping rod 115 adjustably secured in position by means of a binding clamp 116. At its free end rod 115 carries a spring held plunger 117 on the end of which is a clamping plate 118 arranged to coöperate with the corresponding platform 92 to clamp and hold a gathered book thereon when said plate is forced toward said platform. Plate 118 is normally held from approaching corresponding platform 92 by means of a leaf spring 119, as shown in Fig. 11. As shown in Figs. 9, 10, 11 and 12, plunger 110 is provided with a notch 120 which is adapted to be engaged by means of a rocking dog 121 mounted in a transverse slot in head 111. Dog 121 is normally held in engagement with notch 120 by means of a spring 122, and the protruding ends of said dog are provided with beveled cam surfaces 123 which are arranged to strike abutments 124 on rocking member 95 when the corresponding platform 92 is tilted at each end of the movement of rocking member 95 as explained above, and as illustrated more particularly in Fig. 8. The contact of the corresponding cam surface 123 with the corresponding abutment 124 causes the corresponding dog 121 to ride upwardly in its slot and release the corresponding plunger 110, and be held in this position by the action of plunger 110 until said plunger is again forced upwardly and notch 120 again registers with dog 121. Then spring 122 causes the dog to assume its normal central position for operation at the succeeding end of the stroke of rocking member 95. Thus, it will be observed, that as each of the rocking members 95 passes through the central portion of its movement, which is just after a gathered book has been placed on the corresponding platform 92, the lower end of plunger 110 will be struck by the corresponding cam projection 109 and clamping plate 118 forced downwardly on top of the gathered book and thus securely clamp said book to the corresponding platform 92. Likewise, when the corresponding rocking member 95 reaches the end of its movement, gear 94 will be operated to tilt the platform, and dog 121 will be operated to release plunger 110, thus permitting clamping plate 118 to be released by spring 119 from clamping contact with the gathered book and effect the discharge of said book edgewise by gravity. At the opposite end of the movement of each of the rocking members 95 the corresponding platform 92 will be tilted in a position to discharge a gathered book edgewise but in reversed position to the next preceding discharged book. Thus, at the end of each movement of each of the rocking members 95, a gathered book will be discharged edgewise and the alternate discharged books will be alternately positioned so as to bring the folded edges of each alternate book in opposite positions. It will be observed that saddle 107 is arranged to have limited sliding movement on the corresponding rocking member 95 and this is done to time the action thereof properly. At each operation of cam projection 109, the saddle will be forced to the end of its movement before said cam projection will offer sufficient resistance to become operative. At high speeds this preliminary and inoperative movement will take place through the combined actions of inertia and gravity when the movement of the rocking member is checked, such a condition being illustrated in Fig. 6. However, should the combined actions of inertia and gravity be insufficient to effect this movement, the initial contact with the end of plunger 110 will inevitably do so, so that the parts will always be properly timed. As shown in Fig. 1 a trough 125 is arranged under each of the platforms 93 so as to receive the gathered books discharged as explained above. Each of the troughs 125 is equipped with a reciprocating pusher head 126 carrying pusher bars 127 on its operative face. As shown in Fig. 5 each of the heads 126 is connected by means of a link 128 with a crank pin 129 formed on the corresponding shaft 85, the crank pins on the opposite shafts being positioned 90 degrees apart so as to cause operation of the corresponding pusher head immediately after each gathered book is deposited in said trough. A plurality of holding pins 130 are arranged to reciprocate vertically through the bottom of each of the troughs 125, said pins being set to register with the spaces between bars 127 and all being connected together by means of a bar 131 located at their lower ends. Bar 131 is operated by means of a lever 132 having a slot and pin connection at one end therewith and being provided at its other end with a roller 133 riding upon cam 134 on shaft 85. Lever 132 is normally held in position with pins 130 projecting upwardly into trough 125, said pins and the corresponding pusher head 126 being positioned so that each discharged gathered book will fall between them. A slidable weighted partition 136 is arranged in each of the troughs 125 to constitute a support for one end of a stack of gathered books therein. The parts are so timed and arranged that immediately after a book falls between pins 130 and bars 127, said pins are depressed by the action of cam 134 and pusher head 126 pushed forwardly to force said book beyond said pins whereupon pins 130 are projected upwardly in the space between bars 127 to hold said book in its advanced position. Then said pusher head is withdrawn rearwardly to receive the next book and push it forward in like manner. Thus, it will be observed that the books deposited in the respective troughs 125 will be pushed therethrough on their edges in convenient relation and position for bundling or for stitching, and may be readily removed from said troughs for such operations, or, if desired, permitted to feed automatically from the end of said troughs onto any suitable support or into any desired additional machinery.

The mechanism which gathers the books upon table 30 in front of feed pins 45 is illustrated in Figs. 20 to 28 inclusive of the drawings. This mechanism is the same in general construction and plan of operation as that disclosed in my prior application, Serial No. 771,003, filed May 31st, 1913, some minor improvements having been made therein. At each side of the rear end of table 30 I mount a bar 137 upon bearings 138 which reciprocate upon transverse guide rods 139, the bar at the right hand side of the machine as illustrated in Fig. 21, being arranged at a higher elevation than the bar on the other side, but said bars are identical in operation. Said bars are set in recesses 140 in the upper sides of bearings 138 and slats 141 are secured centrally to the upwardly projecting ends of each of said bearings, as indicated in Fig. 23. Bars 142 are secured to the ends of slats 141 and other slats 143 are secured to said bars parallel with slats 141. Side bars 144 are hinged to the ends of bars 142 and slats 145 are secured to bars 144, all of said slats being distanced slightly apart so as to form longitudinal slots 146 in the supporting surface thus provided. The bearings 138 are arranged on opposite sides of table 30 in transversely alining pairs, one of said bearings, and consequently one of said supporting surfaces being provided for each signature of the book to be gathered, as will be readily understood. Adjustably secured in each of the slots 146 is a T-bar 147 which, as shown in Figs. 27 and 29 is provided with a flange 148 bearing against the under sides of the adjacent slats. At their outer ends each of the bars 147 are provided with flanges 149 taking over the tops of the adjacent bars so as to retain said bars in said slots. A headed stop screw 150 is threaded through each of the bars 147 adjacent its operative end and a binding screw 151 is passed loosely through the end of each of said bars adjacent screw 150. The flange portion of the bar is removed at this point and a binding plate 152 is substituted therefor and is threaded upon each of the screws 150 and 151. By this arrangement, it will be observed that screws 150 may be adjusted to different elevations so as to adapt them to engage articles of different thicknesses resting on the slats 141, 143 and 145 and that said screws and bars 147 may be tightly bound in adjusted positions between slats 145 by tightening the corresponding screw 151. An opening 153 is formed in each of the bars 147 adjacent the inner edge of screw 150 to permit the passage of any lint or dirt removed by said screws. As shown in Figs. 22 and 24 a projection 154 is secured centrally to each of the outer slats 145 and an adjusting rod 155 is hingedly connected thereto. Rod 155 slides freely through bar 137 and is adjustably secured in position by means of a set screw 156, so that the sides of the support formed by the slats may be adjusted to different positions because of the angularity thereof so as to support flexible articles thereon in different curved positions, such adjustment being provided so as to accommodate signatures of different thicknesses. The support formed by the slats is in effect a slotted supporting plate and constitutes the bottom of the feed hoppers for the different signatures of the book. The rear of each of the feed hoppers is formed by means of a rod 157 which is transversely slidable in a bracket 158 secured to the frame of the machine below the hopper, and said rod may be secured in adjusted position by means of a set screw 159. As shown in Fig. 23, at its inner end, each of the rods 157 is bent upwardly and then downwardly at 160 to form the outer end of the hopper and carries a cross bar 161 extending transversely across the outer end thereof. As shown in Fig. 22 the sides of each of the hoppers are formed by an angular rod 162 having one portion set vertically and its horizontal portion extending through a cross head 163 where it is adjustably secured by means of a set screw 164. Head 163 is carried by a depending rod 165 which is vertically slidable on the corresponding bar 137 and is rendered adjustable by means of a set screw 166. At its lower end each of the rods 162 carries a cross bar 167 constituting the corresponding side of the corresponding hopper. It will be observed that the outer end and sides of each of the hoppers are formed by members supported from below thus leaving these portions of the hopper comparatively free and unobstructed for the insertion and straightening of the signatures therein. The inner or feed side of each of the hoppers is formed by a vertically sliding bar 168 sliding in guides 169 and carrying an arm 170 which is threaded upon an adjusting screw 171 supported in a bar 172 extending along the corresponding portion of all of the hoppers of the same side of the machine. By this arrangement, it will be observed, that the stop bar 168 may be nicely adjusted to permit the passage of the bottommost signature of the pile in each of the hoppers.

As shown in Fig. 21, each of the bars 137 carries at each of its ends a pivotal block 173 engaging a slot in the upper end of a rocking lever 174, the lower end of said lever being slotted to engage an eccentric cam 175 fixed to a shaft 176, each of the shafts 176 being driven at its forward end by means of a bevel gear 176' engaging bevel gear 59 on shaft 58, as shown in Fig. 1. The cams 175 on opposite sides of the machine are so set as to cause simultaneous reciprocations of the bars 137 and consequently corresponding reciprocation of the bottoms of the various hoppers.

Each of the hopper supports is provided with a centrally inwardly extending narrow supporting finger 177 adapted to pass between two pairs of feed rollers 178 so as to support the corresponding portion of a signature being fed to said feed rollers. By this arrangement it will be observed that at each reciprocation of the bottom plate of each hopper, the bottommost signature will be delivered to the corresponding feed rollers, and thus withdrawn from the hopper and deposited on table 30, the reciprocations of said plates being so timed relatively to the speed of travel of chains 32, that the different signatures will be properly deposited one on top of the other in front of the corresponding pins 45. Feed rollers 178 are mounted respectively on a shaft 179 extending the full length of the hoppers and the counter-shaft 180 connected therewith by means of gears 181. Each of the shafts 179 is driven by means of a sprocket chain 182 from the corresponding shaft 176 as shown in Fig. 21. Each of the shafts 179 is also provided with a hand wheel 183 by means of which the same may be manipulated by hand if desired.

As shown in Fig. 21, lateral positioning plates or bars 184 are arranged on each side of table 30 opposite the feed hoppers and provided with upwardly extending guide fingers 185 adapted to facilitate the deposit of signatures therebetween. At intervals each of the bars 184 carry downwardly extending guide projections 186 operating in corresponding grooves 187 in the top of table 30, as shown in Fig. 22. As shown in Fig. 26, each of the bars 184 are connected by means of rods 188 with the under side of a bar 189 arranged to reciprocate at the corresponding side of the machine in guides 189'. Set screws 190 serve to adjust the position of rods 188 and consequently the bars 184. Each of the bars 189 is connected by means of pivoted links 191 with the blocks 192 pivotally connected with the upper ends of rocker levers 193 which are slotted at their lower ends and engaged with eccentric cams 194 mounted on the corresponding shaft 176. Each of the levers 193 is mounted upon a stud bolt 195, and a plurality of openings 196 are provided in the frame of the machine for the reception of said stud bolt so as to permit of adjustments of said lever to adjust the length of movement of bars 184. By this arrangement, it will be observed that the bars 184 will be reciprocated inwardly and outwardly to laterally position or jog the ends of the book signatures to keep the same in nice registration with each other. By this arrangement, it will be observed that the book signatures may be readily gathered in piles to form a complete book and that these piles will be pushed along table 30 by fingers 45 and removed therefrom, as explained above. Longitudinally and laterally adjustable guides 197 are provided on table 30 beyond positioning bars 184 so as to maintain the gathered books in proper position during their travel over this portion of table 30.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention what I claim as new and desire to secure by Letters Patent is:

1. A stacking machine comprising a conveyer adapted to convey a series of articles; means arranged to remove articles laterally from said conveyer; and means for reversing the position of every other article so removed, substantially as described.

2. A stacking machine comprising a conveyer adapted to convey a series of articles; means arranged to remove articles laterally from alternate sides of said conveyer; and means for reversing the position of every other article so removed, substantially as described.

3. A stacking machine comprising a conveyer adapted to convey a series of articles; means arranged to remove articles laterally from said conveyer; a tiltable supporting platform arranged to receive said articles; and means for alternately tilting said platform in opposite directions and discharging articles therefrom, substantially as described.

4. A stacking machine comprising a conveyer adapted to convey a series of articles; means arranged to remove articles laterally from alternate sides of said conveyer; a tiltable supporting platform arranged to receive said articles; and means for alternately tilting said platform in opposite directions and discharging articles therefrom, substantially as described.

5. A stacking machine comprising a conveyer adapted to convey a series of articles; reciprocatory means arranged to remove articles laterally from said conveyer; and means for reversing the position of every other article so removed, substantially as described.

6. A stacking machine comprising a conveyer adapted to convey a series of articles; reciprocatory means arranged to remove articles laterally from alternate sides of said conveyer; and means for reversing the position of every other article so removed, substantially as described.

7. A stacking machine comprising a conveyer adapted to convey a series of articles; reciprocatory means arranged to remove articles laterally from said conveyer; a tiltable supporting platform arranged to receive said articles; and means for alternately tilting said platform in opposite directions and discharging articles therefrom, substantially as described.

8. A stacking machine comprising a conveyer adapted to convey a series of articles; reciprocatory means arranged to remove articles laterally from alternate sides of said conveyer; a tiltable supporting platform arranged to receive said articles; and means for alternately tilting said platform in opposite directions and discharging articles therefrom, substantially as described.

9. A stacking machine comprising a conveyer adapted to convey a series of articles; a receiving table at the end of said conveyer; means traveling in the same direction as said conveyer but at faster speed arranged to remove articles from said conveyer and place them on said receiving table; and means arranged to remove articles laterally from said receiving table, substantially as described.

10. A stacking machine comprising a conveyer adapted to convey a series of articles; a receiving table at the end of said conveyer; means traveling in the same direction as said conveyer but at faster speed arranged to remove articles from said conveyer and place them on said receiving table; and means arranged to remove articles laterally from alternate sides of said receiving table, substantially as described.

11. A stacking machine comprising a conveyer adapted to convey a series of articles; a receiving table at the end of said conveyer; means traveling in the same direction as said conveyer but at faster speed arranged to remove articles from said conveyer and place them on said receiving table; means arranged to remove articles laterally from said receiving table; and means for reversing the position of every other article so removed, substantially as described.

12. A stacking machine comprising a conveyer adapted to convey a series of articles; a receiving table at the end of said conveyer; means traveling in the same direction as said conveyer but at faster speed arranged to remove articles from said conveyer and place them on said receiving table; means arranged to remove articles laterally from alternate sides of said receiving table; and means for reversing the position of every other article so removed, substantially as described.

13. A stacking machine comprising a conveyer adapted to convey a series of articles; a receiving table at the end of said conveyer; means traveling in the same direction as said conveyer but at faster speed arranged to remove articles from said conveyer and place them on said receiving table; means arranged to remove articles laterally from said receiving table; a tiltable supporting platform arranged to receive said articles; and means for alternately tilting said platform in opposite directions and discharging articles therefrom, substantially as described.

14. A stacking machine comprising a conveyer adapted to convey a series of articles;

a receiving table at the end of said conveyer; means traveling in the same direction as said conveyer but at faster speed arranged to remove articles from said conveyer and place them on said receiving table; means arranged to remove articles laterally from alternate sides of said receiving table; a tiltable supporting platform arranged to receive said articles; and means for alternately tilting said platform in opposite directions and discharging articles therefrom, substantially as described.

15. A stacking machine comprising a conveyer adapted to convey a series of articles; means arranged to remove articles laterally from said conveyer; a tiltable supporting platform arranged to receive said articles; automatic clamping means on said platform arranged to hold articles thereon; and means for alternately tilting said platform in opposite directions and discharging articles therefrom, substantially as described.

16. A stacking machine comprising a conveyer adapted to convey a series of articles; means arranged to remove articles laterally from alternate sides of said conveyer; a tiltable supporting platform arranged at each side of said conveyer to receive said articles; automatic clamping means on each of said platforms arranged to hold articles thereon; and means for alternately tilting said platforms in opposite directions and discharging articles therefrom, substantially as described.

17. A stacking machine comprising a conveyer adapted to convey a series of articles; a receiving table at the end of said conveyer; means traveling in the same direction as said conveyer but at faster speed arranged to remove articles from said conveyer and place them on said receiving table; means arranged to remove articles laterally from said receiving table; a tiltable supporting platform arranged to receive said articles; automatic clamping means on said platform arranged to hold articles thereon; and means for alternately tilting said platform in opposite directions and discharging articles therefrom, substantially as described.

18. A stacking machine comprising a conveyer adapted to convey a series of articles; a receiving table at the end of said conveyer; means traveling in the same direction as said conveyer but at faster speed arranged to remove articles from said conveyer and place them on said receiving table; means arranged to remove articles laterally from opposite sides of said receiving table; a tiltable supporting platform at each side of said receiving table arranged to receive said articles; automatic clamping means on said platforms arranged to hold articles thereon; and means for alternately tilting said platforms in opposite directions and discharging articles therefrom, substantially as described.

19. A stacking machine comprising a slotted table; traveling pins projecting upwardly through the slots in said table and adapted to push articles along the table; and a removing pin arranged to be projected upwardly through said table, travel faster than said first mentioned pins to remove articles therefrom, and then be withdrawn downwardly, substantially as described.

20. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; and means arranged to remove articles laterally from said table, substantially as described.

21. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; and means arranged to remove articles laterally from alternate sides of said table, substantially as described.

22. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; a tiltable supporting platform arranged to receive said articles; and means for alternately tilting said platform in opposite directions and discharging articles therefrom, substantially as described.

23. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; means arranged to remove articles laterally from said table; a tiltable supporting platform arranged to receive said articles; and means for alternately tilting said platform in opposite directions and discharging articles therefrom, substantially as described.

24. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; means arranged to remove articles laterally from alternate sides of said table; a tiltable supporting platform arranged at each side of said table to receive said articles; and means for alternately tilting said platforms in opposite directions and discharging articles therefrom, substantially as described.

25. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; a tiltable supporting platform arranged to receive said articles; automatic clamping means on said platform arranged to hold articles thereon; and means for alternately tilting said platform in opposite directions and discharging articles therefrom, substantially as described.

26. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; means arranged to remove articles laterally from said table; a tiltable supporting platform arranged to receive said articles; automatic clamping means on said platform arranged to hold articles thereon; and means for alternately tilting said platform in opposite directions and discharging articles therefrom, substantially as described.

27. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; means arranged to remove articles laterally from alternate sides of said table; a tiltable supporting platform arranged at each side of said table arranged to receive said articles; automatic clamping means on said platforms arranged to hold articles thereon; and means for alternately tilting said platforms in opposite directions and discharging articles therefrom, substantially as described.

28. A stacking machine comprising a slotted table; traveling pins projecting upwardly through the slots in said table and adapted to push articles along the table; a removing pin arranged to be projected upwardly through said table, travel faster than said first mentioned pins to remove articles therefrom, and then be withdrawn downwardly; means arranged to remove articles laterally from alternate sides of said table; a tiltable supporting platform arranged at each side of said table arranged to receive said articles; automatic clamping means on said platforms arranged to hold articles thereon; and means for alternately tilting said platforms in opposite directions and discharging articles therefrom, substantially as described.

29. A stacking machine comprising a slotted table; traveling pins projecting upwardly through the slots in said table and adapted to push articles along the table; a vertically reciprocating support under said table; a support mounted to reciprocate horizontally on said vertically reciprocating support; and a pin on said horizontally reciprocating support arranged to be projected upwardly through said table, travel faster than said first mentioned pins to remove articles therefrom and then be depressed below said table and returned to initial position, substantially as described.

30. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; and means arranged to remove articles laterally from said table, substantially as described.

31. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; and means arranged to remove articles laterally from alternate sides of said table, substantially as described.

32. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; a tiltable supporting platform arranged to receive said articles; and means for alternately tilting said platform in opposite directions and discharging articles therefrom, substantially as described.

33. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; means arranged to remove articles laterally from said table; a tiltable supporting platform arranged to receive said articles; and means for alternately tilting said platform in opposite directions and discharging articles therefrom, substantially as described.

34. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; means arranged to remove articles laterally from alternate sides of said table; a tiltable supporting platform arranged at each side of said table to receive said articles; and means for alternately tilting said platforms in opposite directions and discharging said articles therefrom, substantially as described.

35. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; means arranged to remove articles laterally from said table; a tiltable supporting platform arranged to receive said articles; automatic clamping means on said platform arranged to hold articles thereon; and means for alternately tilting said platform in opposite directions and discharging articles therefrom, substantially as described.

36. A stacking machine comprising a slotted table; traveling pins projecting upwardly through the slots in said table and adapted to push articles along the table; a vertically reciprocating support under said table; a support mounted to reciprocate horizontally on said vertically reciprocating support; a pin on said horizontally reciprocating support arranged to be projected upwardly through said table, travel faster than said first mentioned pins to remove articles therefrom and then be depressed below said table and returned to initial position; means arranged to remove articles laterally from alternate sides of said table; a tiltable supporting platform arranged at each side of said table to receive said articles; automatic clamping means on said platforms arranged to hold articles thereon; and means for alternately tilting said platforms in opposite directions to discharge articles therefrom, substantially as described.

37. A stacking machine comprising a slotted table; traveling pins projecting upwardly through the slots in said table and adapted to push articles along the table; a vertically oscillating support under said table; a support mounted to reciprocate horizontally on said vertically oscillatory support; and a pin on said horizontally reciprocating support arranged to be projected upwardly through said table, travel faster than said first mentioned pins to remove articles therefrom and then be depressed below said table and returned to initial position, substantially as described.

38. A stacking machine comprising a slotted table; traveling pins projecting upwardly through the slots in said table and adapted to push articles along the table; a vertically oscillating support under said table; a support mounted to reciprocate horizontally on said vertically oscillatory support; a pin on said horizontally reciprocating support arranged to be projected upwardly through said table, travel faster than said first mentioned pins to remove articles therefrom and then be depressed below said table and returned to initial position; and means arranged to remove articles laterally from said table, substantially as described.

39. A stacking machine comprising a conveyer adapted to convey a series of articles; means arranged to remove articles from said conveyer; means for turning said articles edgewise and discharging them; and means for receiving said articles, substantially as described.

40. A stacking machine comprising a conveyer adapted to convey a series of articles; means arranged to remove articles laterally from said conveyer; means for turning said articles edgewise and discharging them; and means for receiving said articles, substantially as described.

41. A stacking machine comprising a conveyer adapted to convey a series of articles; means arranged to remove articles from said conveyer; means for turning said articles edgewise alternately in opposite directions and discharging them; and means for receiving said articles, substantially as described.

42. A stacking machine comprising a conveyer adapted to convey a series of articles; means arranged to remove articles laterally from said conveyer; means for turning said articles edgewise alternately in opposite directions and discharging them; and means for receiving said articles, substantially as described.

43. A stacking machine comprising a conveyer adapted to convey a series of articles; means arranged to remove articles from opposite sides of said conveyer; means for turning said articles edgewise and discharging them; and means for receiving said articles, substantially as described.

44. A stacking machine comprising a conveyer adapted to convey a series of articles; means arranged to remove articles laterally from opposite sides of said conveyer; means for turning said articles edgewise and discharging them; and means for receiving said articles, substantially as described.

45. A stacking machine comprising a conveyer adapted to convey a series of articles; means arranged to remove articles laterally from opposite sides of said conveyer; means for turning said articles edgewise alternately in opposite directions and discharging them; and means for receiving said articles, substantially as described.

46. A stacking machine comprising a conveyer adapted to convey a series of articles; means arranged to remove articles from said conveyer; means for turning said articles edgewise and discharging them; means for receiving said articles; a trough arranged to receive said discharged articles edgewise; and means arranged to push said articles through said trough, substantially as described.

47. A stacking machine comprising a conveyer adapted to convey a series of articles; means arranged to remove articles laterally from said conveyer; means for turning said articles edgewise and discharging them; means for receiving said articles; a trough arranged to receive said discharged articles edgewise; and means arranged to push said articles through said trough, substantially as described.

48. A stacking machine comprising a conveyer adapted to convey a series of articles; means arranged to remove articles from said conveyer; means for turning said articles edgewise alternately in opposite directions and discharging them; means for receiving said articles; a trough arranged to receive said discharged articles edgewise; and means arranged to push said articles through said trough, substantially as described.

49. A stacking machine comprising a conveyer adapted to convey a series of articles; means arranged to remove articles laterally from said conveyer; means for turning said articles edgewise alternately in opposite directions and discharging them; means for receiving said articles; a trough arranged to receive said discharged articles edgewise; and means arranged to push said articles through said trough, substantially as described.

50. A stacking machine comprising a conveyer adapted to convey a series of articles; means arranged to remove articles from opposite sides of said conveyer; means for turning said articles edgewise and discharging them; means for receiving said articles; a trough arranged to receive said discharged articles edgewise; and means arranged to push said articles through said trough, substantially as described.

51. A stacking machine comprising a conveyer adapted to convey a series of articles; means arranged to remove articles laterally from opposite sides of said conveyer; means for turning said articles edgewise and discharging them; means for receiving said articles; a trough arranged to receive said discharged articles edgewise; and means arranged to push said articles through said trough, substantially as described.

52. A stacking machine comprising a conveyer adapted to convey a series of articles; means arranged to remove articles laterally from opposite sides of said conveyer; means for turning said articles edgewise alternately in opposite directions and discharging them; means for receiving said articles; a trough arranged to receive said discharged articles edgewise; and means arranged to push said articles through said trough, substantially as described.

53. A stacking machine comprising a conveyer adapted to convey a series of articles; means arranged to remove articles laterally from said conveyer; a tiltable supporting platform arranged to receive said articles; means for alternately tilting said platform in opposite directions and discharging articles therefrom; a trough arranged to receive said discharged articles edgewise; and means arranged to push said articles through said trough, substantially as described.

54. A stacking machine comprising a conveyer adapted to convey a series of articles; reciprocatory means arranged to remove articles laterally and alternately from opposite sides of said conveyer; a tiltable supporting platform arranged at each side of said conveyer to receive said articles; means for alternately tilting each of said platforms in opposite directions and discharging articles therefrom; troughs arranged to receive said discharged articles edgewise; and means arranged to push said articles through said troughs, substantially as described.

55. A stacking machine comprising a conveyer adapted to convey a series of articles; means arranged to remove articles laterally from said conveyer; a tiltable supporting platform arranged to receive said articles; automatic clamping means on said platform arranged to hold articles thereon; means for alternately tilting said platform in opposite directions and discharging articles therefrom; a trough arranged to receive said discharged articles edgewise; and means arranged to push said articles through said trough, substantially as described.

56. A stacking machine comprising a conveyer adapted to convey a series of articles; reciprocatory means arranged to remove articles laterally and alternately from opposite sides of said conveyer; a tiltable supporting platform arranged at each side of said conveyer to receive said articles; automatic clamping means on each of said platforms arranged to hold articles thereon; means for alternately tilting each of said platforms in opposite directions and discharging articles therefrom; troughs arranged to receive said discharged articles edgewise; and means arranged to push said articles through said troughs, substantially as described.

57. A stacking machine comprising a conveyer; means arranged to remove articles laterally from said conveyer; a tiltable supporting platform arranged to receive said articles; a pinion arranged to tilt said platform; an oscillatory member provided with gear teeth at each side of said pinion and arranged to engage said pinion at each end of the oscillation thereof; and means for holding said platform from tilting during intermediate movements of said oscillatory member, substantially as described.

58. A stacking machine comprising a conveyer; means arranged to remove articles laterally from said conveyer; a tiltable supporting platform arranged to receive said articles; a pinion arranged to tilt said platform; an oscillatory member provided with gear teeth at each side of said pinion and arranged to engage said pinion at each end of the oscillation thereof; and means on said oscillatory member for holding said platform from tilting during intermediate movements of said oscillatory member, substantially as described.

59. A stacking machine comprising a conveyer; means arranged to remove articles laterally from said conveyer; a tiltable supporting platform arranged to receive said articles; a pinion arranged to tilt said platform; an oscillatory member provided with gear teeth at each side of said pinion and arranged to engage said pinion at each end of the oscillation thereof; a clamping plate on said platform arranged to clamp articles thereon; means for automatically operating said clamping plate to hold and discharge articles on and from said platform; and means for holding said platform from tilting during intermediate movements of said oscillatory member, substantially as described.

60. A stacking machine comprising a conveyer; means arranged to remove articles laterally from said conveyer; a tiltable supporting platform arranged to receive said articles; a pinion arranged to tilt said platform; an oscillatory member provided with gear teeth at each side of said pinion and arranged to engage said pinion at each end of the oscillation thereof; a clamping plate on said platform arranged to clamp articles thereon; means for automatically operating said clamping plate to hold and discharge articles on and from said platform; and means on said oscillatory member for holding said platform from tilting during intermediate movements of said oscillatory member, substantially as described.

61. A stacking machine comprising a conveyer; means arranged to remove articles laterally from said conveyer; a tiltable supporting platform arranged to receive said articles; a pinion arranged to tilt said platform; an oscillatory member provided with gear teeth at each side of said pinion and arranged to engage said pinion at each end of the oscillation thereof; a clamping plate on said platform arranged to clamp articles thereon; means on said oscillatory member for automatically operating said clamping plate to hold and discharge articles on and from said platform; and means for holding said platform from tilting during intermediate movements of said oscillatory member, substantially as described.

62. A stacking machine comprising a conveyer; means arranged to remove articles laterally from said conveyer; a tiltable supporting platform arranged to receive said articles; a pinion arranged to tilt said platform; an oscillatory member provided with gear teeth at each side of said pinion and arranged to engage said pinion at each end of the oscillation thereof; a clamping plate on said platform arranged to clamp articles thereon; means on said oscillatory member for automatically operating said clamping plate to hold and discharge articles on and from said platform; and means on said oscillatory member for holding said platform from tilting during intermediate movements of said oscillatory member, substantially as described.

63. A stacking machine comprising a conveyer; means arranged to remove articles laterally and alternately from opposite sides of said conveyer; a tiltable supporting platform arranged at each side of said conveyer to receive said articles; a pinion arranged to tilt each of said platforms; an oscillatory member provided with gear teeth at each side of each of said pinions and arranged to engage said pinion at each end of the oscillation thereof; and means for holding said platforms from tilting during intermediate movements of said oscillatory members, substantially as described.

64. A stacking machine comprising a conveyer; means arranged to remove articles laterally and alternately from opposite sides of said conveyer; a tiltable supporting platform arranged at each side of said conveyer to receive said articles; a pinion arranged to tilt each of said platforms; an oscillatory member provided with gear teeth at each side of each of said pinions and arranged to engage said pinion at each end of the oscillation thereof; and means on said oscillatory members for holding said platforms from tilting during intermediate movements of said oscillatory members, substantially as described.

65. A stacking machine comprising a conveyer; means arranged to remove articles laterally and alternately from opposite sides of said conveyer; a tiltable supporting platform arranged at each side of said conveyer to receive said articles; a pinion arranged to tilt each of said platforms; an oscillatory member provided with gear teeth at each side of each of said pinions and arranged to engage said pinion at each end of the oscillation thereof; a clamping plate on each of said platforms arranged to clamp articles thereon; means for automatically operating said clamping plates to hold and discharge articles on and from said platforms; and means for holding said platforms from tilting during intermediate movements of said oscillatory members, substantially as described.

66. A stacking machine comprising a conveyer; means arranged to remove articles laterally and alternately from opposite sides of said conveyer; a tiltable supporting platform arranged at each side of said conveyer to receive said articles; a pinion arranged to tilt each of said platforms; an oscillatory member provided with gear teeth at each side of each of said pinions and arranged to engage said pinion at each end of the oscillation thereof; a clamping plate on each of said platforms arranged to clamp articles thereon; means for automatically operating said clamping plates to hold and discharge articles on and from said platforms; and means on said oscillatory members for holding said platforms from tilting during intermediate movements of said oscillatory members, substantially as described.

67. A stacking machine comprising a conveyer; means arranged to remove articles laterally and alternately from opposite sides of said conveyer; a tiltable supporting platform arranged at each side of said conveyer to receive said articles; a pinion arranged to tilt each of said platforms; an oscillatory member provided with gear teeth at each side of each of said pinions and arranged to engage said pinions at each end of the oscillation thereof; a clamping plate on each of said platforms arranged to clamp articles thereon; means on said oscillatory member for automatically operating each of said clamping plates to hold and discharge articles on and from said platforms; and means for holding said platforms from tilting during intermediate movements of said oscillatory members, substantially as described.

68. A stacking machine comprising a conveyer; means arranged to remove articles laterally and alternately from opposite sides of said conveyer; a tiltable supporting platform arranged at each side of said conveyer to receive said articles; a pinion arranged to tilt each of said platforms; an oscillatory member provided with gear teeth at each side of each of said pinions and arranged to engage said pinions at each end of the oscillation thereof; a clamping plate on each of said platforms arranged to clamp articles thereon; means on said oscillatory member for automatically operating each of said clamping plates to hold and discharge articles on and from said platforms; and means on said oscillatory members for holding said platforms from tilting during intermediate movements of said oscillatory members, substantially as described.

In testimony whereof I have signed my name to this specification in the presence of two subscribing witnesses.

CAREY A. CHESHIRE.

Witnesses:
JOSHUA R. H. POTTS,
B. G. RICHARDS.